United States Patent
Okada et al.

(10) Patent No.: US 10,482,370 B2
(45) Date of Patent: Nov. 19, 2019

(54) IDENTIFICATION METHOD AND IDENTIFICATION MEDIUM

(71) Applicant: TOPPAN PRINTING CO., LTD., Tokyo (JP)

(72) Inventors: Takashi Okada, Tokyo (JP); Tomohito Masuda, Tokyo (JP); Eri Miyamoto, Tokyo (JP); Kota Aono, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 15/991,924

(22) Filed: May 29, 2018

(65) Prior Publication Data

US 2018/0276523 A1 Sep. 27, 2018

Related U.S. Application Data

(63) Continuation of application No. PCT/JP2016/085514, filed on Nov. 30, 2016.

(30) Foreign Application Priority Data

Nov. 30, 2015 (JP) ................. 2015-233244

(51) Int. Cl.
*G06K 7/10* (2006.01)
*G06K 19/16* (2006.01)
(Continued)

(52) U.S. Cl.
CPC ............. *G06K 19/16* (2013.01); *B42D 25/30* (2014.10); *B42D 25/324* (2014.10);
(Continued)

(58) Field of Classification Search
USPC .................................................. 235/462.01
See application file for complete search history.

(56) References Cited

U.S. PATENT DOCUMENTS

| 2015/0262347 A1 | 9/2015 | Duerksen et al. |
| 2016/0196472 A1 | 7/2016 | Duerksen et al. |

(Continued)

FOREIGN PATENT DOCUMENTS

| JP | 2000-148922 A | 5/2000 |
| JP | 2004-171109 A | 6/2004 |

(Continued)

OTHER PUBLICATIONS

International Search Report with English language translation and Written Opinion issued in International Application No. PCT/JP2016/085514 dated Feb. 28, 2017.

(Continued)

*Primary Examiner* — Ahshik Kim
(74) *Attorney, Agent, or Firm* — Foley & Lardner LLP

(57) ABSTRACT

An identification method for performing authenticity determination on an identification medium having code information and having a variable light pattern portion whose pattern of observed light varies upon a change in an observation angle and for performing reading of the code information includes generating, for captured image data of the variable light pattern portion of the identification medium, reference image data corresponding to the observation angle as the angle of an imaging direction of the captured image data with respect to a reference line of an observation target surface of the identification medium by a reference image generation unit, obtaining a degree of similarity between the captured image data and the reference image data, and performing, based on whether the degree of similarity exceeds a preset threshold, authenticity determination about whether the identification medium is authentic and reading the code information.

8 Claims, 14 Drawing Sheets

(51) Int. Cl.
  *G07D 7/12* (2016.01)
  *B42D 25/36* (2014.01)
  *B42D 25/30* (2014.01)
  *B42D 25/328* (2014.01)
  *G07D 7/202* (2016.01)
  *G06K 7/14* (2006.01)
  *G06K 9/46* (2006.01)
  *B42D 25/425* (2014.01)
  *B42D 25/324* (2014.01)
  *B42D 25/342* (2014.01)
  *B42D 25/364* (2014.01)
  *B42D 25/47* (2014.01)
  *B42D 25/445* (2014.01)
  *B42D 25/373* (2014.01)

(52) U.S. Cl.
  CPC ......... *B42D 25/328* (2014.10); *B42D 25/342* (2014.10); *B42D 25/36* (2014.10); *B42D 25/364* (2014.10); *B42D 25/373* (2014.10); *B42D 25/425* (2014.10); *B42D 25/445* (2014.10); *B42D 25/47* (2014.10); *G06K 7/1443* (2013.01); *G06K 9/4609* (2013.01); *G07D 7/12* (2013.01); *G07D 7/202* (2017.05)

(56) References Cited

U.S. PATENT DOCUMENTS

| | | | |
|---|---|---|---|
| 2016/0307035 A1* | 10/2016 | Schilling | G07D 7/128 |
| 2018/0215188 A1* | 8/2018 | Wang | B42D 25/30 |
| 2019/0034773 A1* | 1/2019 | Vosoogh-Grayli | G06K 7/10722 |

FOREIGN PATENT DOCUMENTS

| | | |
|---|---|---|
| JP | 2006-350995 A | 12/2006 |
| JP | 3865763 B2 | 1/2007 |
| JP | 2010-262394 A | 11/2010 |
| JP | 2012-022455 A | 2/2012 |
| JP | 2014-182767 A | 9/2014 |
| JP | 2015-055909 A | 3/2015 |
| WO | WO-2014/092193 A1 | 6/2014 |
| WO | WO-2014/148338 A1 | 9/2014 |
| WO | WO-2015-082332 A1 | 6/2015 |
| WO | WO-2015-138820 A1 | 9/2015 |

OTHER PUBLICATIONS

Extended European Search Report dated Nov. 27, 2018 in corresponding application No. 16870698.4.

* cited by examiner

IDENTIFICATION METHOD AND IDENTIFICATION MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/085514, filed on Nov. 30, 2016, which is based upon and claims the benefit of priority to Japan Priority Application 2015-233244, filed Nov. 30, 2015, the disclosures of which are all hereby incorporated herein by reference in their entireties.

TECHNICAL FIELD

The present invention relates to an identification method and an identification medium for performing authenticity determination against counterfeiting of securities such as gift tickets, credit cards, brand goods, equipment components, consumables, etc.

BACKGROUND ART

Typically, anti-counterfeiting media (hereinafter "identification media") for preventing unauthorized use by counterfeiting/duplication of products are used for securities such as paper currency, stock certificates, gift vouchers and credit cards, and products such as medical goods, food goods, and expensive brand goods For the securities, the identification medium may be directly printed or transferred.

For the products, a seal or a tag provided with the identification medium is provided.

However, unauthorized securities and products with counterfeited or duplicated identification media have been recently manufactured, and it has been difficult to determine, based only on the presence or absence of the identification media, whether these securities and products are authentic or fake (counterfeit goods, duplicated goods, etc.).

Examples of the above-described identification medium include a diffraction grating and a hologram whose color or pattern is variable according to an observation angle. Moreover, other examples of the identification medium include optically variable inks and pearl pigments whose color or brightness is variable, and application of a microlens.

With a method by comparison with an authentic identification medium, examination by a specialist, etc., it is easily determined whether the anti-counterfeiting medium is authentic or fake. However, for general users, it is difficult to visually perform anti-counterfeiting authenticity determination.

In a case where authenticity determination on the identification medium cannot be visually performed, a special authenticity determination device (see, e.g., Patent Document 1) capable of precisely controlling an observation angle of an imaging device with respect to the identification medium is utilized.

However, special knowledge and special tools are required for handling the above-described authenticity determination device, and for this reason, it is difficult for general users to determine authenticity of the identification medium using such a device.

Meanwhile, particularly in distribution of medical goods, food goods, expensive brand goods, etc., not only authenticity of these products but also product information and product distribution paths have been advertised to general users, and in this manner, an attempt has been made to enhance the value of the products.

In the above-described fields, code information is provided to individual products by a two-dimensional code typified by a so-called bar code or a QR code (registered trademark), or character information such as numbering.

There is a case where guiding to a web site for displaying related information, playing of a lottery, mail delivery, etc. are performed by input or reading of the code information into a mobile terminal or a PC terminal.

For the QR code (registered trademark), it has been proposed that the code is blocked and part of the blocked code is encrypted (see, e.g., Patent Document 2).

However, the above-described code information can be easily duplicated by a copy machine etc. Even when the code is encrypted, if the code information itself is duplicated, it is difficult to perform product authenticity determination from the identification medium merely having the code information.

For this reason, it has been proposed that a portion having a visual authenticity determination function and code information readable by infrared light are combined together as in Patent Document 3.

In the above-described method, it is difficult to duplicate the code information using a copy machine etc., but it is difficult for general users to perform authenticity determination for identification media which seem similar. Moreover, special dedicated equipment is also required for reading the code information.

[Citation List] [Patent Literature] [PTL 1] JP 3865763 B; [PTL 2] JP 2000-148922 A; [PTL 3] WO 2014/148338.

SUMMARY OF THE INVENTION

Technical Problem

The present invention has been made in view of the above-described situation. The present invention provides an identification method capable of easily performing, using an identification medium manufactured at relatively low cost and having both of code information and an authenticity determination function, authenticity determination based on an image of the identification medium captured by a simple image capturing device such as a versatile digital camera without use of a special authenticity determination device as is typically used and without depending on an installation situation of the identification medium while reading the code information provided on the identification medium, and provides an identification medium.

Solution to Problem

A first aspect of the present invention is the identification method for performing authenticity determination on an identification medium having code information and having a variable light pattern portion whose pattern of observed light varies with change in an observation angle and for performing reading of the code information. The method includes generating, for captured image data of the variable light pattern portion of the identification medium, reference image data corresponding to the observation angle as the angle of an imaging direction of the captured image data with respect to a reference line of an observation target surface of the identification medium by a reference image generation unit, obtaining the degree of similarity between the captured image data and the reference image data, and performing, based on whether the degree of similarity exceeds a preset threshold, the authenticity determination about whether the identification medium is authentic and reading the code information.

A second aspect of the present invention is the identification method according to the first aspect, in which an authenticity determination unit compares each of a plurality of different pieces of the captured image data and the reference image data corresponding to the observation angle for the captured image data, thereby performing the authenticity determination based on whether the degree of similarity between the captured image data and the reference image data exceeds the threshold.

A third aspect of the present invention is the identification method according to the first or second aspect, in which an available image selection unit is further provided, the available image selection unit being configured to determine whether the observation angle for the captured image data is within a range available for the authenticity determination on the variable light pattern portion of the identification medium, select captured image data available for the authenticity determination from the captured image data, and output the selected captured image data as available captured image data.

A fourth aspect of the present invention is the identification method according to any one of the first to third aspects, in which an observation angle estimation unit is further provided, the observation angle estimation unit being configured to obtain, in a three-dimensional space where the identification medium is placed when the captured image data is captured, capture position and direction of the captured image data by a predetermined coordinate transformation equation, thereby obtaining the observation angle from the capture position and direction.

A fifth aspect of the present invention is the identification method according to any one of the first to fourth aspects, in which according to a result of the authenticity determination, operation of application software corresponding to the read code information is controlled.

A sixth aspect of the present invention is the identification method according to any one of the first to fifth aspects, in which the imaging process of acquiring the captured image data and the process of reading the code information are performed by an identical imaging unit.

A seventh aspect of the present invention is the identification method according to any one of the first to sixth aspects, in which the imaging process of acquiring the captured image data and the process of reading the code information are simultaneously performed by the identical imaging unit.

An eighth aspect of the present invention is the identification method according to any one of the first to seventh aspects, in which determination of a positional relationship between the variable light pattern portion and a code information recording portion is performed before the authenticity determination.

A ninth aspect of the present invention is an identification medium having code information. In the identification medium, a variable light pattern portion whose pattern of observed light varies with change in an observation angle and a portion for recording the code information are provided adjacent to each other.

A tenth aspect of the present invention is an identification medium having code information. In the identification medium, a portion forming the code information changes the pattern of light observed upon a change in an observation angle.

An eleventh aspect of the present invention is the identification medium according to the ninth or tenth aspect, in which at least part of the code information is encrypted.

Desired Advantageous Effects of the Invention

According to the above-described aspects of the present invention, the identification method can be provided, which is capable of more easily performing, using the identification medium having both of the code information and the authenticity determination function, authenticity determination based on the image of the identification medium captured by a simple image capturing device such as a versatile digital camera without use of a special authenticity determination device as is typically used and without depending on an installation situation of the identification medium while reading the code information provided on the identification medium.

DESCRIPTION OF REPRESENTATIVE EMBODIMENTS

Hereinafter, an authenticity determination technique according to an embodiment of the present invention will be described with reference to the drawings. It is to be understood that the embodiment is intended to be representative of the present invention and that the present invention is not necessarily limited to the discussion below.

Figure 1:
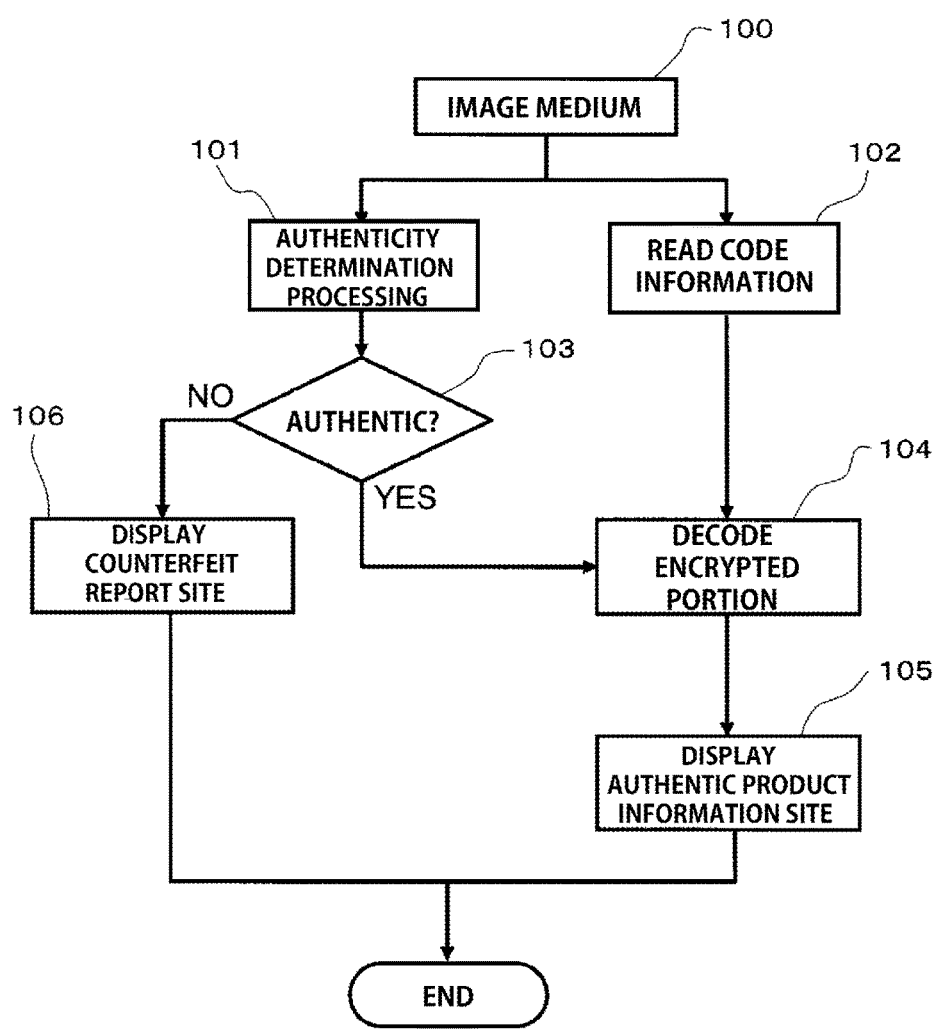
FIG. 1 is a flowchart of an example of an identification method of the present invention.

FIG. 1 is a flowchart of an example of an identification method of the present invention. As will be seen from FIG. 1, when imaging 100 of an identification medium 120 (described later) is performed, the authenticity determination processing 101 of determining, based on image data, whether the identification medium 120 is an authentic product or a fake product while reading 102 of code information provided on the identification medium 120 can be performed.

At this point, determination 103 on whether the identification medium 120 is authentic is performed. When it is determined as not being an authentic product, countermeasures such as displaying 106 of a counterfeit report site can be taken. When it is determined as being an authentic product, decode processing 104 of a code incorporated in at least part of the read code information is performed, and displaying 105 of an authentic product information site can be performed.

At this point, the code information is not necessarily encrypted. However, for providing higher security, at least part of the code information is preferably encrypted.

Key information necessary for the decode processing 104 of the code may be managed on the identification medium 120, an imaging unit 201, or a server side via a network.

Figure 2:
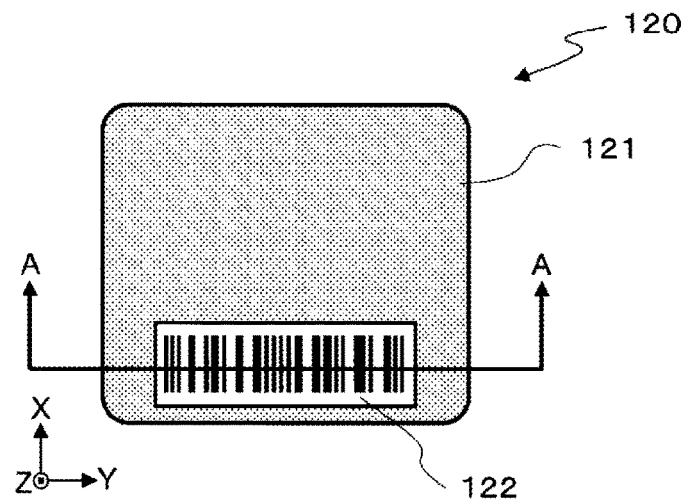
FIG. 2 is a plan view of an example of an identification medium of the present invention.
Figure 3:
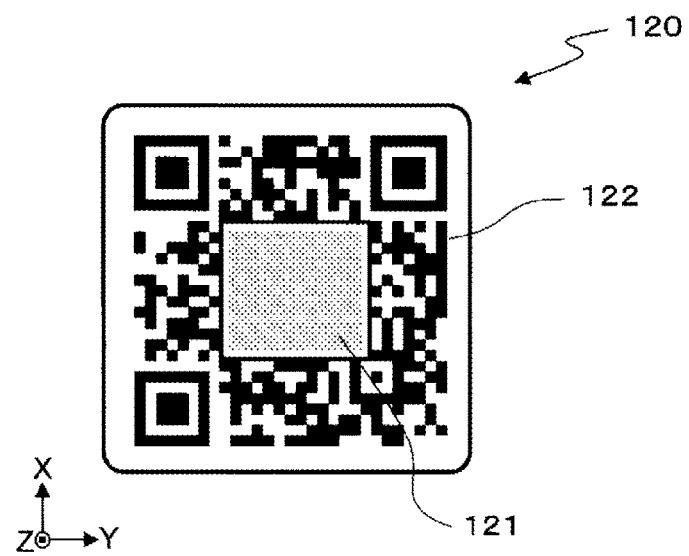
FIG. 3 is a plan view of an example of the identification medium of the present invention.
Figure 4:
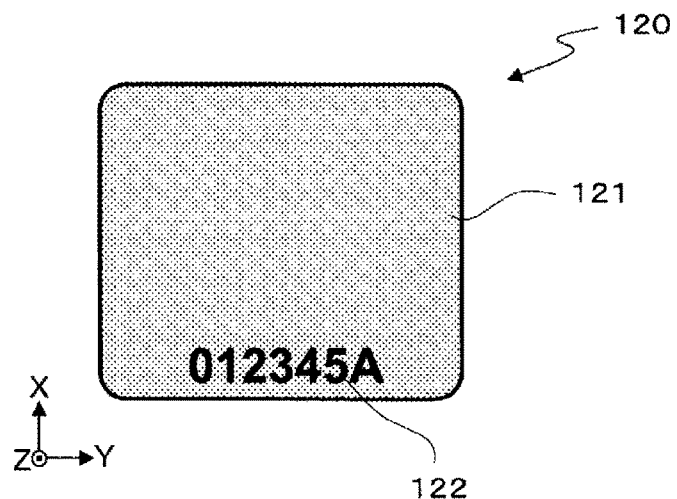
FIG. 4 is a plan view of an example of the identification medium of the present invention.

Further, the code information used for a code information recording portion 122 can be used in various code forms as illustrated in FIGS. 2 to 4.

The code information recording portion 122 illustrated in FIG. 2 uses a so-called bar code, and various codes including not only a JAN code, an EAN code, and a UPC code but also ITF, CODE39, CODE128, and NW-7 can be used as necessary as the form of the bar code.

Moreover, a QR code (the registered trademark) is used in the code information recording portion 122 illustrated in FIG. 3.

Note that the QR code (the registered trademark) illustrated as an example in FIG. 3 is provided as an example of a two-dimensional code, and includes, but is not limited to, matrix codes such as an SP code, VeriCode, MaxiCode, a CP code, DataMatrix, Code1, AztecCode, and an intacta code. A stacked code can be selected as necessary from various two-dimensional codes and color bar codes such as PDF417, Code49, Code16K, Codablock, SuperCode, UltraCode, RSS Composite, and AztecMeta (these code names include registered trademarks).

Further, as illustrated in FIG. 4, the code information recording portion 122 may be recorded as character information.

In this case, the character information may be OCR-read, or in some cases, a method of inputting a character string by a person may be employed.

The form of the code information is not limited to above, and may be a digital watermark in a particular image or a dot code, for example. Further, some kinds of unique patterns readable by image recognition may be employed.

The identification medium 120 has a variable light pattern portion 121 in addition to the code information recording portion 122. The variable light pattern portion 121 is imaged such that authenticity determination about whether the identification medium 120 is the authentic product is performed. At this point, imaging of the code information recording portion 122 and the variable light pattern portion 121 may be performed by the same imaging unit 201. Considering convenience to a general user, it is preferable that the imaging process for the authenticity determination processing and the imaging process for reading the code information do not overlap with each other.

As described above, the variable light pattern portion 121 provided at the identification medium 120 is imaged, and in this manner, authenticity determination about whether the identification medium 120 is the authentic product is performed. The following configuration of the variable light pattern portion 121 used herein can be provided. Note that, e.g., the method for the authenticity determination processing will be described in detail later.

Any portions can be used as the variable light pattern portion 121 as long as a color or a pattern changes according to an observation angle. Examples of such portions include use of various structures or inks such as diffraction gratings or holograms, optically variable inks or pearl pigments, or multilayer bodies with a stack of cholesteric liquid crystal or a stack of layers with different refraction indices.

An example of the configuration using the diffraction grating will be described later. The inks can be provided on the identification medium 120 using well-known printing methods such as a screen printing method, a gravure printing method, a flexographic printing method, and an offset printing method or various coating methods.

Further, various well-known techniques can be used, which include, for example, an image which varies upon observation according to an observation angle by a combination of a lens structure such as a lenticular lens or a microlens with a printed image, a so-called intaglio latent image by intaglio printing, or a print seen as if a color or a print pattern changes according to an observation angle by position adjustment of an intaglio printing machine and offset printing.

Alternatively, a fluorescent material emitting light in a particular visible light region may be printed by white light irradiation such as flash exposure.

Each technique applied to these variable light pattern portions 121 may be provided alone or in combination of techniques.

The variable light pattern portion 121 and the code information recording portion 122 are provided adjacent to each other or at the same portion as described above, and therefore, an identification medium having code information which is extremely difficult to duplicate using a copy machine etc. can be provided.

Figure 5:
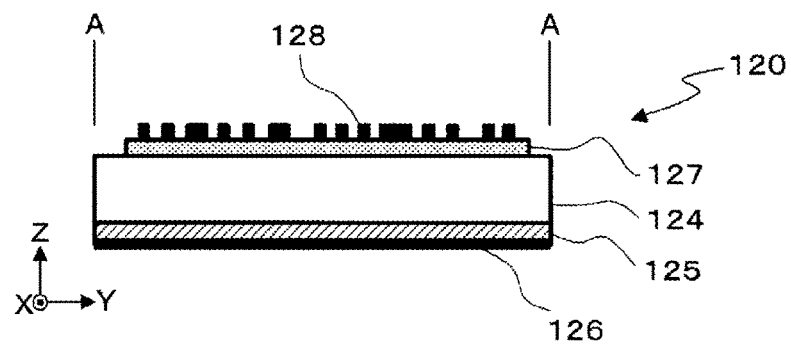
FIG. 5 is a cross-sectional side view of an example sectional configuration along line A-A of FIG. 2.

FIG. 5 is a sectional view of an example sectional configuration along line A-A of FIG. 2 in a case where the variable light pattern portion 121 is a relief diffraction grating or hologram.

The example sectional configuration in a case where the variable light pattern portion 121 is the relief diffraction grating or hologram as illustrated in FIG. 5 is a configuration with a support body 124.

Any support bodies can be used as the support body 124 as long as a transparent base material is employed. Examples of the support body 124 include films or sheets made of resin exhibiting optical transparency, such as polycarbonate (PC), acrylic, polyethylene terephthalate (PET), polyethylene naphthalate (PEN), and triacetylcellulose (TAC). An inorganic material such as glass may be used as the material of the support body 124.

The support body 124 may have a single-layer structure or a multilayer structure. Further, the support body 124 may be subjected to various types of processing such as antireflection processing, low reflection prevention processing, hard coating processing, antistatic processing, or adhesion facilitation processing.

A resin exhibiting optical transparency can be used as a material of a recessed-raised structure formation layer 125, and thermoplastic resin, thermosetting resin, and resin curable with radiation such as light or an electron beam can be used.

For these types of resin, not only the diffraction grating or the hologram but also various recessed-raised structures including multiple recessed or raised portions can be easily formed on one surface of the support body 124 by a thermographic transfer method using an original plate.

The materials of the support body 124 and the recessed-raised structure formation layer 125 may be identical to or different from each other. A release/demolding layer, an intermediate layer, etc. may be further provided between the support body 124 and the recessed-raised structure formation layer 125 while an adhesive layer etc. is provided on a surface of a light reflection layer 126. This can form a transfer foil.

Note that in the case of a transfer foil structure, the support body 124 is detached after transferring to a transfer target body. For this reason, a white color masking layer 127 and a code information printing portion 128 in FIG. 5 are not provided on the opposite surface of the support body 124, but may be provided on the transferred release layer or provided between adjacent ones of the layers from the release layer to the light reflection layer 126.

For example, a metal layer made of aluminum, copper, silver, chromium, or alloy thereof can be used as the light reflection layer 126. Alternatively, a dielectric layer with a refractive index different from that of the recessed-raised structure formation layer 125 may be used as the light reflection layer 126.

Alternatively, a multilayer body of dielectric layers whose refractive index is different between adjacent ones of the dielectric layers, i.e., a multilayer dielectric film, may be used as the light reflection layer 126. Note that the refractive index of one of the dielectric layers of the multiplayer dielectric film contacting the recessed-raised structure formation layer 125 is preferably different from that of the recessed-raised structure formation layer 125.

After the light reflection layer 126 has been formed by a vapor deposition method or a sputtering method, a patterned mask layer may be formed using a mask print layer or a photoresist, and then, may be formed into a pattern shape using the chemical etching method performing etching by means of an etching solution etc.

Alternatively, after pattern printing has been performed for the recessed-raised structure formation layer 125 using ink containing water-soluble resin, the light reflection layer 126 may be provided by, e.g., a vapor deposition method or a sputtering method, and then, the light reflection layer 126 may be patterned using, e.g., the aqueous etching method for performing, including the water-soluble resin, water washing processing.

A method for pattern formation of the light reflection layer 126 is not limited to above, and the pattern can be formed by any methods.

In a case where the light reflection layer 126 is patterned as described above, the code information printing portion 128 may be, after the light reflection layer 126 has been patterned, provided at a portion from which the light reflection layer 126 has been removed.

Figure 6:
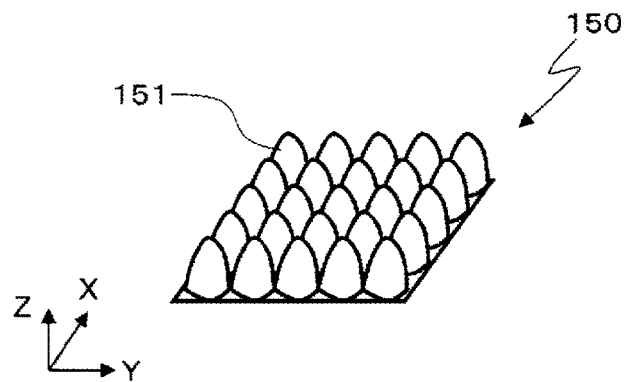
FIG. 6 is a perspective view of a recessed-raised structure of a cross grating.

Structures such as a so-called relief diffraction grating structure having a groove-shaped structure with a recessed or raised portion, a scattering structure having directivity, i.e. having a region where multiple linear recessed or raised portions in one direction are formed and including a combination of multiple regions different from each other in different directions, and a cross grating structure 150 having multiple raised portions 151 as illustrated in FIG. 6 can be provided alone or in combination on the surface of the recessed-raised structure formation layer 125 opposite to the surface contacting the support body 124.

Note that in FIG. 6, the cross grating structure 150 is illustrated as the raised portions 151, but may be configured as a recessed structure. A recessed-raised structure formed at the recessed-raised structure formation layer 125 is not limited to the above-described structures.

In particular, when the recessed-raised structure provided at the recessed-raised structure formation layer 125 is the above-described relief diffraction grating structure, many normal diffraction gratings have a spatial frequency of 500 to 1600 cycles/mm, and therefore, different colors can be displayed upon observation from a certain direction according to the spatial frequency or direction of the diffraction grating.

In the case of the scattering structure having directivity, multiple light scattering structures in a certain orientation direction in a particular segment or cell are provided. The light scattering structures are each in a linear shape, and are arrayed substantially parallel to each other in the particular segment or cell. Note that the light scattering structures are not necessarily fully parallel to each other, and a longitudinal direction of some of the light scattering structures and a longitudinal direction of other ones of the light scattering structures may intersect with each other as long as a scattering structure region having directivity exhibits sufficient anisotropy.

The above-described structure is taken in the scattering structure having directivity, and therefore, light scattering situation can be, depending on the orientation direction, differently observed according to a light irradiation direction or an observation direction.

In a case where the cross grating structure 150 including the raised portions 151 as illustrated in FIG. 6 or recessed portions is provided at the recessed-raised structure formation layer 125, a forward tapered shape formed such that a distance between the centers of adjacent ones of the raised or recessed portions is constant and is equal to or less than 400 nm is preferable.

The forward tapered shape described herein specifically includes, for example, shapes such as a conical shape, a pyramid shape, an elliptic conical shape, a hemispherical shape, a semi-elliptical shape, a bullet shape, and a bowl shape.

Figure 7:
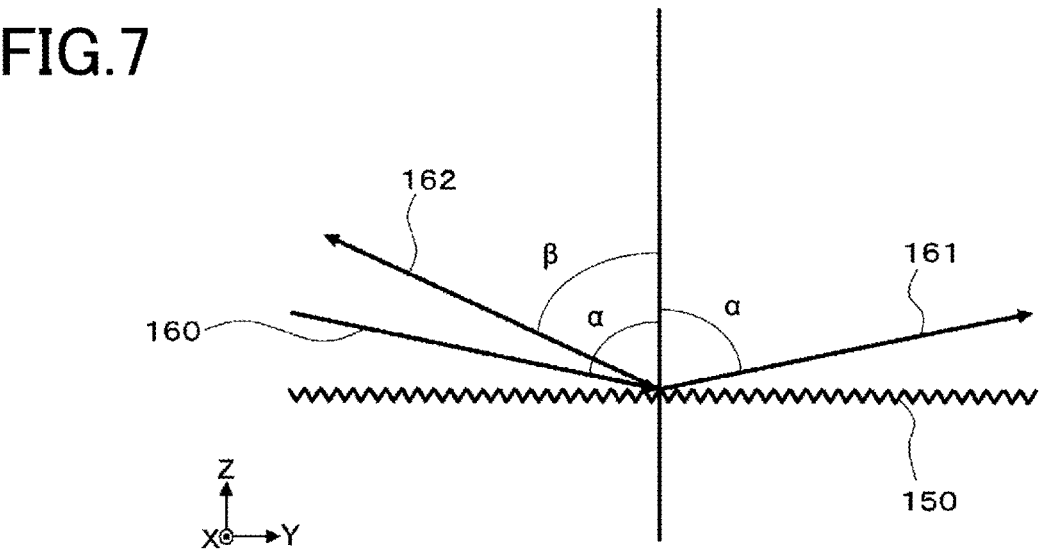
FIG. 7 is a conceptual diagram for describing light diffraction by the recessed-raised structure.

With the above-described structure, when the cross grating structure 150 is irradiated with light, first-order diffracted light 162 can be, with respect to incident light 160, emitted in a direction difficult to be produced by a normal diffraction grating, as illustrated in FIG. 7.

Hereinafter, light diffraction will be described with reference to FIG. 7.

Generally, the diffracted light can be represented by the following expression:

$$d(\sin \alpha \pm \sin \beta) = n\lambda \qquad (1)$$

In this equation (1), d represents the distance between the centers of the raised or recessed portions, and $\lambda$ represents the wavelengths of the incident light and the diffracted light. Moreover, $\alpha$ represents the incident angle of the incident light, and $\beta$ represents the emission angle of the diffracted light. Further, n represents an order. The most representative diffracted light is first-order diffracted light, and therefore, it can be considered that n=1 is satisfied.

The incident angle α can be taken as the same angle as the emission angle of zero-order diffracted light, i.e., specular reflected light, and for α and β, a clockwise direction from a normal direction as a Z-axis direction in FIG. 7 is taken as a positive direction.

Thus, the equation (1) is transformed into the following expression (2).

$$d(\sin \alpha - \sin \beta) = \lambda \tag{2}$$

Thus, when the distance d between the centers of the raised or recessed portions and the incident angle α are constant, the emission angle β of the first-order diffracted light 162 changes according to the wavelength λ, as clearly seen from the equation (2).

The distance between the centers of the raised or recessed portions of the cross grating structure 150 is set to be equal to or less than 400 nm so that the emission angle |β| of the first-order diffracted light 62 with a particular wavelength can be designed to be in the vicinity of the incident angle under an environment where the incident angle α of white light is 60° to 90°.

For example, in a case where incident angle α=60° and d=340 nm are satisfied, the emission angle |β| at λ=600 nm is about 64°.

This produces a characteristic optical effect difficult to be produced by a normal diffraction grating. Of white light irradiation from a particular angle, only light in a particular wavelength region can be retroreflectively diffracted.

Figure 8:
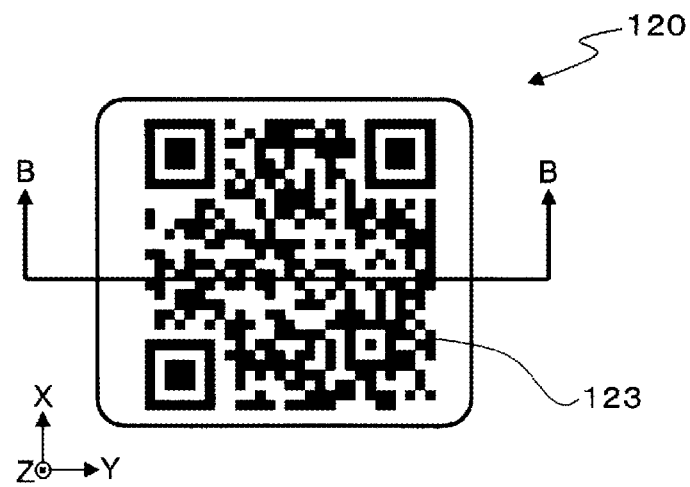
FIG. 8 is a plan view of an example of the identification medium of the present invention.
Figure 9:
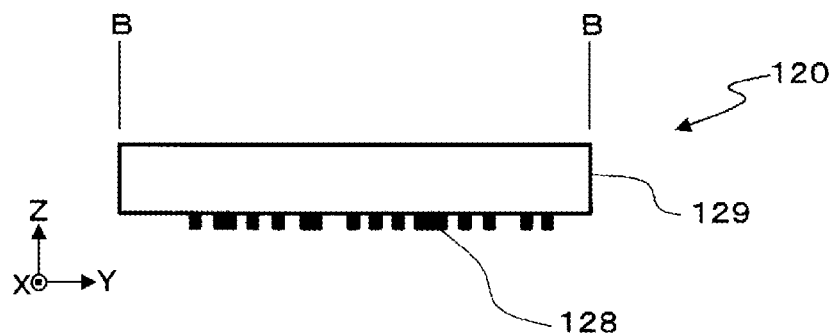
FIG. 9 is a cross-sectional side view of an example sectional configuration along line B-B of FIG. 8.

FIG. 8 illustrates an example where the code information recording portion 122 and the variable light pattern portion 121 are formed in the same pattern, and FIG. 9 is a sectional view of an example sectional configuration along line B-B of FIG. 8.

For example, a multilayer body with a stack of cholesteric liquid crystal layers or a stack of layers with different refraction indices can be used as an angle dependent color changing layer 129 in FIG. 9. Alternatively, an ink layer using pigmented fragments of a cholesteric liquid crystal layer or a pearl pigment may be used.

A black-colored code information printing portion 128 is preferably provided as a layer below the angle dependent color changing layer 129. With this configuration, a color change according to the observation angle can be observed by observation through the angle dependent color changing layer 129.

The code information printing portion 128 and the angle dependent color changing layer 129 can be directly provided on an article by a printing method etc., but an adhesive layer may be provided to cover the code information printing portion 128 to bond the code information printing portion 128 to the article. Alternatively, a protection layer etc. may be provided on the surface of the angle dependent color changing layer 129 opposite to the code information printing portion 28, and layers such as an anchor layer, a colored layer, a masking layer, and an adhesive layer may be further provided below the code information printing portion 128 according to intended use.

Hereinafter, the method for performing authenticity determination after the variable light pattern portion 121 of the identification medium 120 obtained as described above has been imaged will be described.

<First Authenticity Determination Technique>

Figure 10:
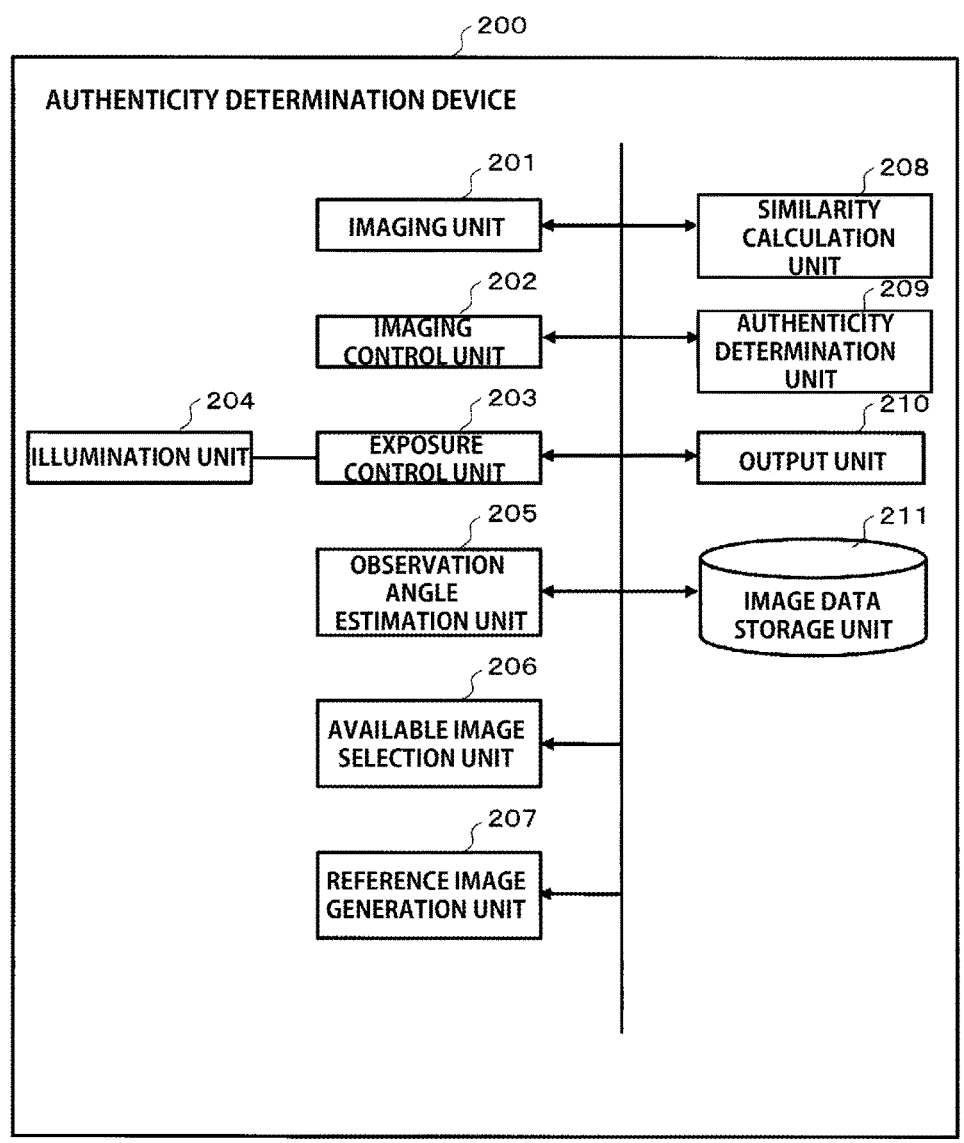
FIG. 10 is a block diagram of an example configuration of a device applied to a first authenticity determination technique.

FIG. 10 is a block diagram of an example configuration of an authenticity determination device in a first authenticity determination technique.

In FIG. 10, the authenticity determination device 200 includes the imaging unit 201, an imaging control unit 202, an exposure control unit 203, an illumination unit 204, an observation angle estimation unit 205, an available image selection unit 206, a reference image generation unit 207, a similarity calculation unit 208, an authenticity determination unit 209, an output unit 210, and an image data storage unit 211.

In an identification method of the first authenticity determination technique, the imaging unit 201 and the illumination unit 204 are integrated, and a configuration corresponding to the authenticity determination processing for the identification medium 120 and providing a retroreflective effect is employed.

The imaging unit 201 is, for example, a camera using an image sensor such as a charge coupled device (CCD) or a complementary metal oxide semiconductor (CMOS), and is configured to write and store, as captured image data, a captured image of a target in the image data storage unit 211.

The imaging control unit 202 is configured to control imaging conditions of the imaging unit 201 such as a focal length and imaging element sensitivity (ISO sensitivity) when the image data as the image captured from a light pattern (a light color (wavelength) or an image such as a character or an illustration) emitted from the identification medium 20 in response to the incident light is captured by the imaging unit 201.

The exposure control unit 203 is configured to control, as imaging conditions during exposure, the imaging conditions of the imaging unit 201 such as shutter speed, aperture value, the presence or absence of illumination light, and illumination light intensity.

Moreover, the exposure control unit 203 is configured to output, according to brightness of the periphery of the identification medium 120 to be imaged by the authenticity determination device 200, a light emission instruction to the illumination unit 204 in the case of requiring illumination light during imaging.

The illumination unit 204 may be not only a normal illumination configured to continuously irradiate an imaging target with light, but also a light emission device called a "flash" or "electronic flash" configured to irradiate the imaging target with light for a short period of time.

The illumination unit 204 irradiates the imaging target, in response to the light emission instruction from the exposure control unit 203, with a predetermined intensity of light. The imaging control unit 202 described herein supplies the exposure control unit 203 with a control signal indicating imaging timing. With this configuration, the exposure control unit 203 outputs, in response to the control signal supplied from the imaging control unit 202 and indicating the imaging timing, the light emission instruction to the illumination unit 204 such that the illumination unit 204 emits the illumination light for irradiation of the identification medium 120 as described above.

The observation angle estimation unit 205 is configured to obtain, from a coordinate transformation equation (described later), an observation position (a coordinate value) as a position at which the image data of the identification medium 120 is captured in a three-dimensional space and an imaging direction of the imaging unit 201. That is, the observation angle estimation unit 205 obtains, from the obtained observation position and imaging direction, the observation angle of the identification medium 120 in the captured image data.

The observation angle estimation unit 205 writes and stores, in a captured image data table of the image data storage unit 211, not only captured image data identification information provided to the captured image data for identifying the captured image data, but also captured image data information including the obtained observation position and observation angle. The pattern of light observed after having been emitted from the identification medium 120 in response to the incident light varies according to the observation angle.

In the present authenticity determination technique, one or more pieces of the image data of the identification medium 120 are captured with a predetermined focal length by the imaging unit 201. In the case of capturing a plurality of pieces of the image data as described herein, the image data needs to be captured with different observation angles among the pieces of the captured image data.

The observation angle estimation unit 205 uses, as described above, the preset coordinate transformation equation, thereby estimating the observation angle of each piece of the captured image data of the identification medium 120 in the three-dimensional space from one or more pieces of the captured image data.

The coordinate transformation equation used herein is an equation generated in such a manner that a pixel position at two-dimensional coordinates on each piece of the captured image data and a coordinate position in the three-dimensional space are associated with each other when the three-dimensional space is reproduced in advance from a plurality of pieces of the captured image data as preprocessing (preparation for authenticity determination) of the authenticity determination processing for the identification medium 120 provided at an authenticity determination target (an article). The pre-generated coordinate transformation equation is written and stored in advance for each article in the image data storage unit 211.

Figure 11:
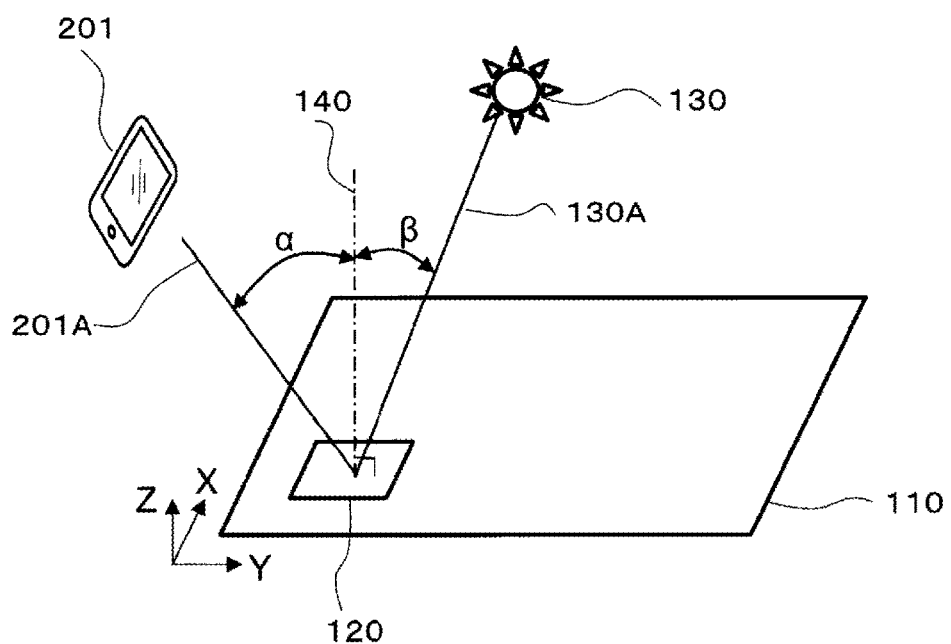
FIG. 11 is a conceptual diagram for describing an observation angle of an imaging unit with respect to the identification medium.

FIG. 11 is a view for describing the observation angle of the identification medium 120 from the imaging unit 201. In FIG. 11, the identification medium 120 is provided on a surface of an article 110.

In the present authenticity determination technique, the variable light pattern portion 121 of the identification medium 120 is, for example, a diffraction grating or hologram whose color or pattern is variable according to the observation angle, and various other materials or techniques as described above can be used.

A light source (also called "illumination") 130 is configured to irradiate the identification medium 120 with imaging light at the irradiation angle β as an angle between a light irradiation direction 130A and a normal line 140.

Moreover, an angle between an imaging direction 201A of the imaging unit 201 and the normal line 140 is the observation angle □, and the pattern of light emitted from the variable light pattern portion 121 of the identification medium 120 in response to the irradiated light varies according to each of the observation angle □ and the irradiation angle β.

For example, in a case where the article 110 is a credit card, the observation angle estimation unit 205 arranges the credit card in a three-dimensional coordinate system such that a direction parallel with the normal line 140 is taken as a Z-axis and each side of the credit card is parallel with an X-axis or a Y-axis.

For example, the credit card is arranged in a two-dimensional plane including the X-axis and the Y-axis such that any of vertices on the sides of the credit card is coincident with the origin O of the three-dimensional coordinate system.

The three-dimensional shape of the credit card is, as known information, written and stored in advance in the image data storage unit 211 together with the already-described coordinate transformation equation.

Note that a target image is not necessarily an entire image of the article 110. For example, an edge portion of the identification medium may be recognized, or a frame border may be provided in advance at an edge portion of the identification medium 120 or may be provided at a peripheral edge portion of the article 110 at a position provided with the identification medium 120. Then, the above-described processing may be performed for each side of these frame borders. A case where the entire image of the credit card is targeted will be subsequently described as an example.

When the observation angle for each piece of the captured image data is obtained, the observation angle estimation unit 205 reads the captured image data from the image data storage unit 211. Then, the observation angle estimation unit 205 associates each coordinate of the three-dimensional shape of the credit card in the three-dimensional coordinate system and each pixel (each coordinate) of the captured image data (the two-dimensional coordinate system) with each other according to the above-described coordinate transformation equation, thereby obtaining the capture position of the image data in the three-dimensional coordinate system and the capture direction of the image data from such a capture position.

That is, the observation angle estimation unit 205 obtains, with reference to the three-dimensional shape of the credit card, the position and direction of capturing the image data by the imaging unit 201 in the three-dimensional coordinate system, thereby obtaining the imaging angle α.

The observation angle estimation unit 205 writes and stores, in the image data storage unit 211, not only the captured image data identification information of the captured image data, but also each of the obtained observation angle, the obtained observation position, and a captured image data address of the captured image data.

In the present authenticity determination technique, camera calibration should, as a desired precondition, be performed for the imaging unit 201 in advance. Camera calibration is as follows: a calibration board whose three-dimensional shape is known is photographed one or more times in a photographing region, and one or more pieces of captured image data are used to associate coordinate points in a three-dimensional coordinate system of a three-dimensional space and a plurality of coordinate points (two-dimensional pixels) in a two-dimensional coordinate system of the captured image data. With this configuration, the above-described coordinate transformation equation indicating a relative positional relationship (hereinafter "external parameter") between the imaging unit 201 and the calibration board is estimated while the optical center of the imaging unit 201, a light beam incident vector at each pixel (each two-dimensional pixel), lens distortion, etc. (hereinafter "internal parameters of the imaging unit 201") are estimated.

A technique according to Z. Zhang (Z. Zhang, "A flexible new technique for camera calibration," IEEE Transactions on Pattern Analysis and Machine Intelligence, Vol. 22, No. 11, pages 1330-1334, 2000), can be applied as an example of the camera calibration technique, thereby estimating the observation angle when the image data is captured. Note that in a case where the observation angle is estimated by application of the above-described calibration technique by Z. Zhang, the captured image data to be inputted needs to be image data captured at a focal length (preferably, the same focal length) similar to a focal length fixed in camera calibration.

In the present authenticity determination technique, the available image selection unit 206 is configured to select available captured image data for use in the authenticity processing from the image data captured by the imaging unit 201. The available image selection unit 206 described herein determines, when the captured image data available for the authenticity processing from the image data is captured by the imaging unit 201, whether the observation angle of the captured image data is within a determination angle available for authenticity determination. Moreover, the available image selection unit 206 determines, for example, whether the entirety of the shape of the identification medium 120 is included in the captured image data, whether the identification medium 120 has been brought into focus, whether the luminance histogram distribution is suitable, or whether reading of the code information is available.

The available image selection unit 206 selects the captured image data available for reading of the code information with the observation angle being within the determination angle available for the authenticity processing. The available image selection unit 206 provides the determined image data identification information to the selected captured image data, and stores, as authenticity determination processing image data, such information together with the captured image data in the image data storage unit 211.

Moreover, after the code information has been read and the authenticity determination processing has been performed, the code information is utilized according to application software.

The reference image generation unit 207 is configured to generate reference image data for comparison with the captured image data selected by the available image selection unit 206. The reference image data is image data observed from the same observation angle as that of the captured image data, and is, according to the structure of the identification medium 120, obtained by simulation or obtained from pre-captured image data of the identification medium.

Thus, the reference image generation unit 207 generates the reference image data according to the configuration of the variable light pattern portion 121 in use. For example, in the case of such a configuration that the variable light pattern portion 121 is formed using a diffraction grating, the reference image data is, based on diffraction grating structural information, calculated and generated by simulation using a reference image generation function using the observation angle as a parameter. The reference image generation unit 207 writes and stores the generated reference image data in the image data storage unit 211.

Alternatively, in a case where calculation by simulation is difficult, such as the case of optically variable inks or pearl pigments, the identification medium 120 is imaged from any angle, and a database of the captured image data is compiled as the reference image data in the image data storage unit 211. With this configuration, the reference image generation unit 207 may employ the following method: the reference image data is read from the database according to the observation angle of the captured image data to be compared, and is associated with captured image data identification information of the captured image data to be compared.

The similarity calculation unit 208 is configured to read the authenticity determination captured image data and the reference image data from the image data storage unit 211, thereby calculating the degree of similarity of each image by template matching. For example, the similarity calculation unit 208 obtains a mean square error of a luminance value for each corresponding pixel (in the case of a color image, each of RGB (red, green, and blue)) on the authenticity determination captured image data and the reference image data, and then, adds the mean square error for all pixels or some corresponding pixels. Then, the similarity calculation unit 208 outputs a result of the addition as a numerical value indicating the degree of similarity. Thus, a lower numerical value of the degree of similarity results in a higher degree of similarity between the authenticity determination captured image data and the reference image data. A characteristic light pattern portion significantly different from other pixels on the reference image data according to the observation angle is selected for some corresponding pixels.

Alternatively, the similarity calculation unit 208 may employ such a configuration that after conversion of each numerical value of RGB of all pixels or some corresponding pixels of the authenticity determination captured image data and the reference image data into a proper color space, a square value of a Euclidean distance of the color space is accumulated and a result of the addition is outputted as the numerical value indicating the degree of similarity. In this case, a lower numerical value of the degree of similarity results, as in the case of using the mean square error, in a higher degree of similarity between the authenticity determination captured image data and the reference image data.

In a case where the illumination light intensity during capturing of image data does not correspond to the reference image data, simple pixel comparison cannot be performed.

For this reason, it may be configured such that evaluation is performed based on the RGB color tone between predetermined pixels. That is, it may be configured such that a mean square error between R/G (a ratio between the pixel value of R and the pixel value of G) between predetermined pixels of the captured image data and R/G between pixels of the reference image data corresponding to the predetermined pixels of the captured image data is calculated for absorption of an illumination light intensity difference and the numerical value indicating the degree of similarity is calculated with high accuracy.

The phrase "between the predetermined pixels" indicates a group of two pixels A, B, and R/G is taken as a ratio obtained by division of the pixel value of R by the pixel value of G for each pixel.

Alternatively, not only R/G but also B/G (a ratio between the pixel value of B and the pixel value of G) may be used in combination.

The combination of pixels here is predetermined so that R/G and B/G are large.

The authenticity determination unit 209 is configured to read all of the degrees of similarity associated with the authenticity determination captured image data from the image data storage unit 211, thereby comparing such degrees with a preset similarity threshold.

The similarity threshold is obtained and set in advance as an experimental value obtained as follows: the degree of similarity between the image data captured at an arbitrary angle and the reference image data obtained according to the observation angle of the captured image data is calculated for a plurality of different angles, and a numerical value exceeding the above-described degree of similarity for each identical observation angle is taken as the experimental value.

The different degrees of similarity are obtained according to the observation angle, and the authenticity determination unit 209 performs the authenticity determination processing for the identification medium using the similarity threshold corresponding to the observation angle.

The output unit 210 is configured to output and display an image etc. on a display screen of the output unit 210 itself, such as a liquid crystal display.

The imaging control unit 202 determines whether the observation angle during imaging of the identification medium 120 falls within a preset angle range. In a case where the observation angle falls outside the preset angle range, an indication of not satisfying the angle range can be outputted to prompt a user to adjust the observation angle.

In a case where there is an error in the focal length, the presence or absence of illumination, or the illumination intensity, the imaging control unit 202 can also prompt the user to adjust these parameters.

In a case where an adjustment instruction in these imaging processes is provided and it is, based on the above-described authenticity determination processing result, determined that the identification medium 120 is fake, the counterfeit report site for reporting that the article 110 provided with the identification medium 120 is fake is displayed.

In a case where it is determined that the identification medium 120 is authentic, the user is guided to the authentic product information site from the already-read code information, and various services are provided.

At this point, in a case where part of the code information is encrypted, deciphering is performed in response to the determination result indicating that the identification medium 120 is authentic, and therefore, a safer service can be provided to the user.

Figure 12:
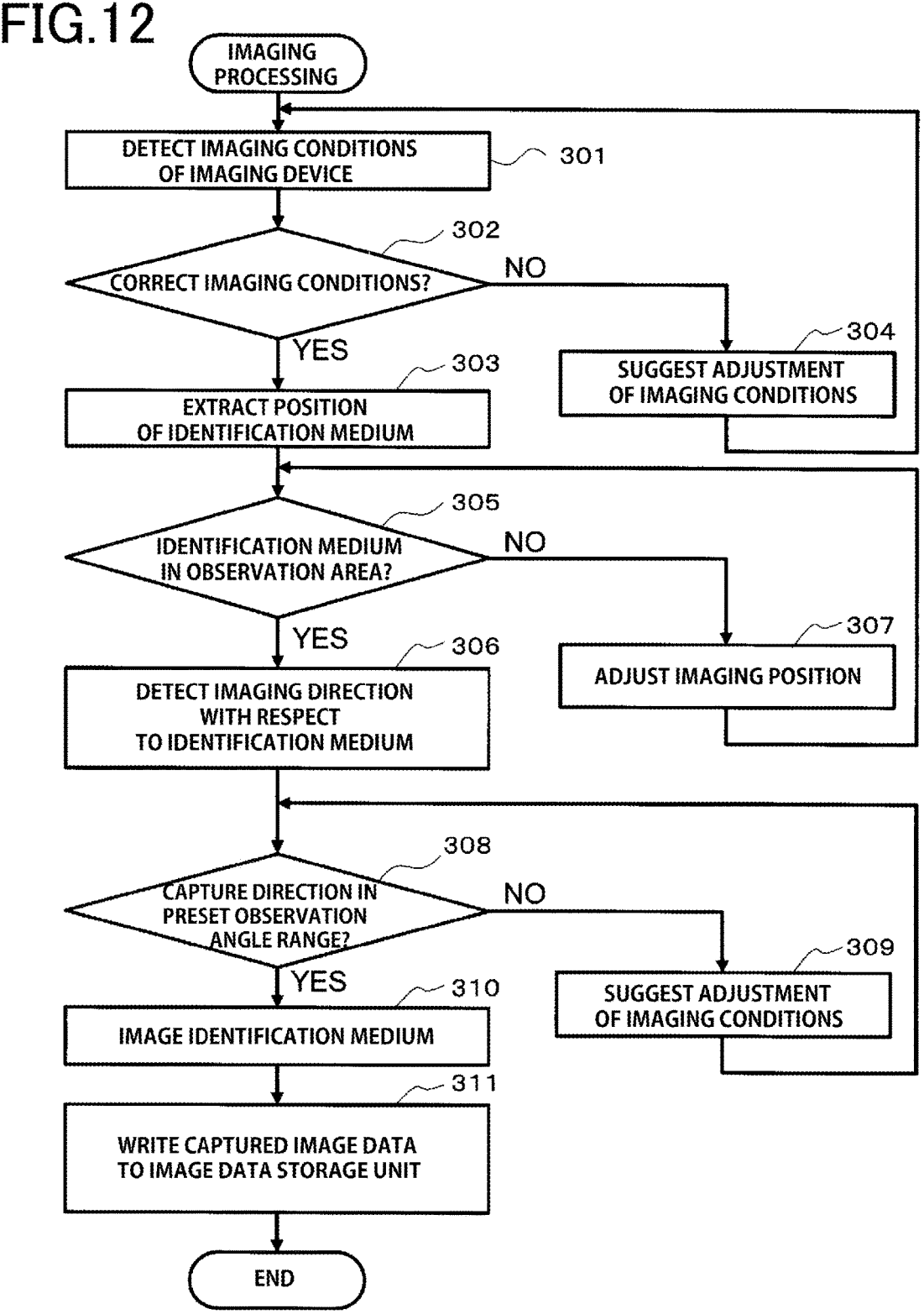
FIG. 12 is a flowchart of an example of imaging processing applied to the first authenticity determination technique.

FIG. 12 is a flowchart of an example imaging operation for capturing the image data in the identification method by the first authenticity determination technique.

(Step 301)
The imaging control unit 202 detects current imaging conditions for an authenticity determination target in the imaging unit 201, such as an observation angle, a focal length, and exposure conditions.

(Step 302)
The imaging control unit 202 determines whether all of the imaging conditions such as the focal length and the exposure conditions are conditions for capturing image data with quality comparable with the reference image data.

At this point, the imaging control unit 202 proceeds to step 303 in a case where the imaging conditions are fully satisfied, and proceeds to step 304 in a case where the imaging conditions are not fully satisfied.

(Step 303)
The imaging control unit 202 extracts an imaging position of the identification medium 120 on the captured image data.

(Step 304)
The imaging control unit 202 outputs unsatisfied imaging conditions to the output unit 210, thereby suggesting to the user to adjust the imaging conditions.

(Step 305)
The imaging control unit 202 compares the identification medium 120 in an imaging area of the imaging unit 201 and the identification medium 120 in the pre-stored three-dimensional shape of the article 110.

Then, the imaging control unit 202 determines whether the entirety of the identification medium 120 is within an observation region for capturing the image data.

At this point, the imaging control unit 202 proceeds to step 306 in a case where the identification medium 120 is within the observation region of the imaging unit 201, and proceeds to step 307 in a case where the identification medium 120 is not within the observation region.

(Step 306)
The imaging control unit 202 causes the observation angle estimation unit 205 to perform the processing of estimating the imaging direction, i.e., the observation angle, of the identification medium 120.

Thus, the observation angle estimation unit 205 obtains, as the observation angle, the angle between the imaging direction 201A of the imaging unit 201 and the normal line 140, and transmitting the information to the imaging control unit 202.

(Step 307)
The imaging control unit 202 suggests to the user, via the output unit 210, to adjust the imaging position of the imaging unit 201 such that the entire region of the identification medium 120 is included within the imaging area of the imaging unit 201.

(Step 308)
The imaging control unit 202 determines whether the capture direction of the image data of the entirety of the identification medium 120, i.e., the observation angle, is within a preset angle range.

At this point, the imaging control unit 202 proceeds the processing to a step 310 in a case where the observation angle of the imaging unit 201 falls within the angle range, and proceeds the processing to a step 309 in a case where the observation angle of the imaging unit 201 does not fall within the angle range.

(Step 309)
The imaging control unit 202 suggests to the user, via the output unit 210, to adjust the imaging direction of the imaging unit 201 such that the observation angle of the imaging unit 201 is within the preset angle range.

(Step 310)
The imaging control unit 202 displays, via the output unit 210, an indication that imaging of the identification medium 120 is possible, thereby prompting the user to image the identification medium 120.

Then, the user checks a display screen, and inputs an imaging instruction. In this manner, the image data is captured.

(Step 311)
The imaging control unit 202 provides the captured image data identification information to the captured image data, and writes and stores such information in the image data storage unit 211.

Imaging processing is performed through the above-described step examples.

Figure 13:
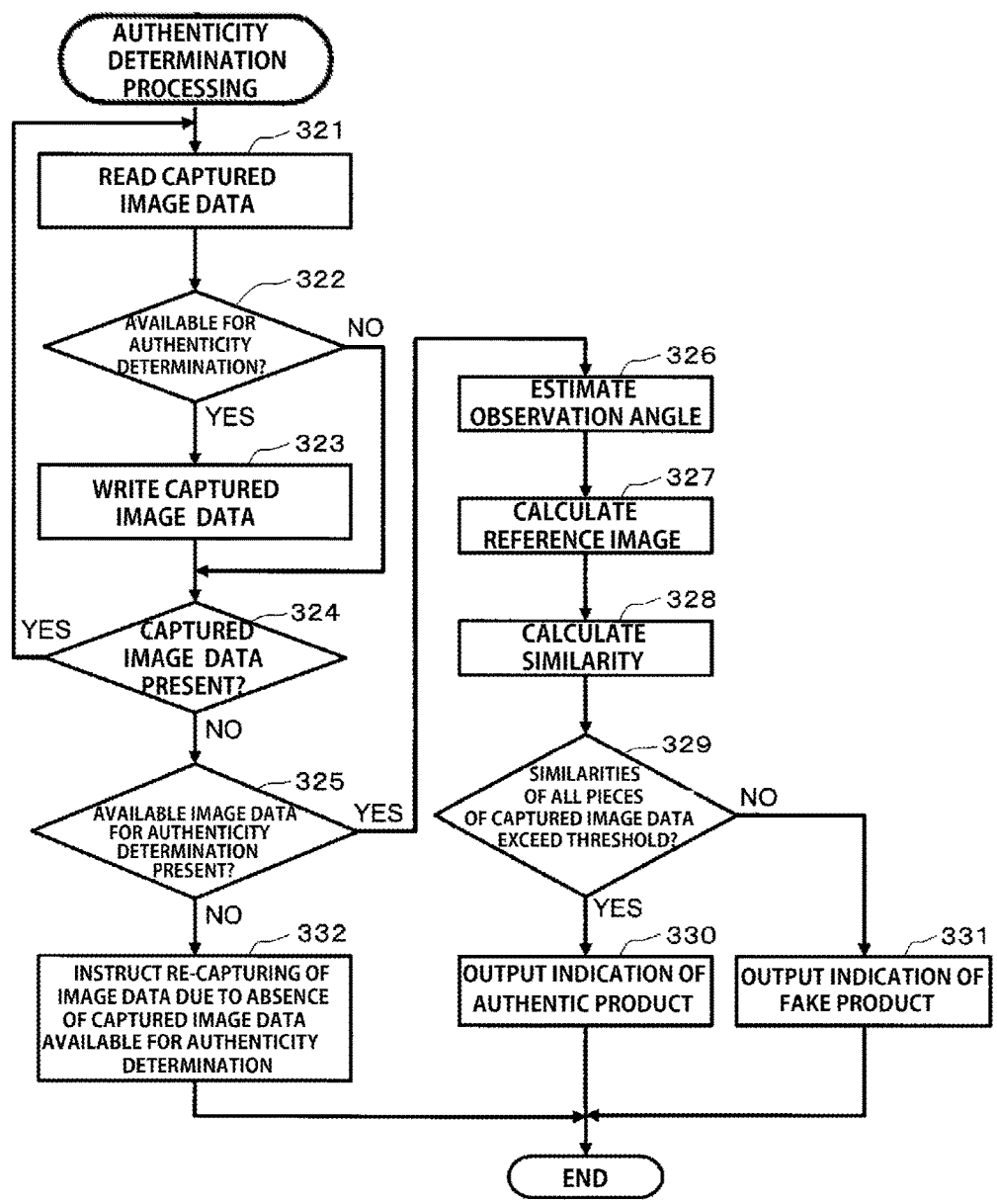
FIG. 13 is a flowchart of an example of the first authenticity determination technique.

Next, FIG. 13 is a flowchart of an example operation of the authenticity determination processing in the identification method by the first authenticity determination technique.

(Step 321)
The available image selection unit 206 sequentially reads the captured image data from the image data storage unit 211, thereby using such data for determination of whether comparison with the reference image data is available.

(Step 322)
The available image selection unit 206 determines whether each piece of the read captured image data can be compared with the reference image data. At the same time, determination about whether reading of the code information is available may be made.

At this point, the available image selection unit 206 proceeds the processing to a step 323 in a case where the captured image data can be compared with the reference image data, and proceeds the processing to a step 324 in a case where the captured image data cannot be compared with the reference image data.

(Step 323)

In a case where it is determined that comparison is available, the available image selection unit 206 provides the determined image data identification information to the captured image data, and writes and stores, as the authenticity determination captured image data, not only the provided determined image data identification information but also the captured image data identification information on the captured image data in the image data storage unit 211.

(Step 324)

The available image selection unit 206 determines whether the captured image data for which the processing of determining whether comparison is available is not performed yet remains in the image data storage unit 211. The processing proceeds to a step 321 in a case where captured image data for which the determination processing has not been not performed yet remains, and proceeds to a step 325 in a case where there is no such data remaining.

(Step 325)

The available image selection unit 206 determines, in the image data storage unit 211, the presence or absence of the captured image data (the authenticity determination captured image data) to which the determined image data identification information has been provided. The processing proceeds to a step 326 in a case where the authenticity determination captured image data is present, and proceeds to a step 332 in a case where the authenticity determination captured image data is absent.

(Step 326)

The observation angle estimation unit 205 reads the authenticity determination captured image data from the image data storage unit 211, and then, obtains the observation angle for each piece of the captured image data in the three-dimensional coordinate system and outputs this angle to the reference image generation unit 207.

(Step 327)

The reference image generation unit 207 generates, based on the observation angle for each piece of the authenticity determination captured image data, the reference image data corresponding to the observation angle for each piece of the captured image data by predetermined simulation. The generated reference image data is linked with the authenticity determination captured image data as a target for the authenticity determination processing, and then, is written and stored in the image data storage unit 211.

(Step 328)

The similarity calculation unit 208 sequentially reads the authenticity determination captured image data from the image data storage unit 211, thereby calculating the degree of similarity of the authenticity determination captured image data to the linked reference image data by template matching. The calculated degree of similarity is associated with the authenticity determination captured image data, and then, is written and stored in the image data storage unit 211.

(Step 329)

The authenticity determination unit 209 sequentially reads the authenticity determination captured image data from the image data storage unit 211, thereby determining whether the degree of similarity provided to each piece of the data is less than the preset similarity threshold.

In a case where the degree of similarity of the authenticity determination captured image data is less than the similarity threshold, the identification medium 120 is taken as authentic, and then, the processing proceeds to a step 330. In a case where the degree of similarity is equal to or greater than the similarity threshold, the identification medium 120 is decided to be fake, and the processing proceeds to a step 331.

(Step 330)

An indication of the authentic identification medium 120 is outputted, and then, the authenticity determination processing ends.

Moreover, in response to the output result, a service such as displaying of the authentic product site begins based on the code information (the code is decoded in the case where an encrypted portion is present).

(Step 331)

An indication of the fake identification medium 120 is outputted, and then, the authenticity determination processing ends. Moreover, in response to an output result, the fake product site is displayed, for example.

(Step 332)

The captured image data available for use in authenticity determination is no longer present, and therefore, the available image selection unit 206 newly captures the image data to again display an image for prompting the authenticity determination processing on the display screen via the output unit 210.

As described above, the authenticity determination processing by the present authenticity determination technique is performed to compare the captured image data and the reference image data with each other, thereby performing authenticity determination for the identification medium 120. Thus, authenticity determination can be performed by, e.g., a versatile digital camera or mobile terminal without use of a special authenticity determination device as would be used in a typical case, and without depending on an installation situation of the identification medium 120. Moreover, the code information is also read so that high security can be provided.

<Second Authenticity Determination Technique>

Authenticity determination processing in a second authenticity determination technique can be performed using a device similar to that of FIG. 10. In the first authenticity determination technique, the authenticity determination processing is performed even in the case of a single piece of the captured image data being available for use in authenticity determination. However, in the second authenticity determination technique, the authenticity determination processing is performed only in the case of there being a predetermined number of pieces of captured image data or more available for use in authenticity determination.

Each piece of the image data described herein needs to be captured from different observation angles. Imaging processing can be performed in a manner similar to that of the flowchart of FIG. 12.

Figure 14:
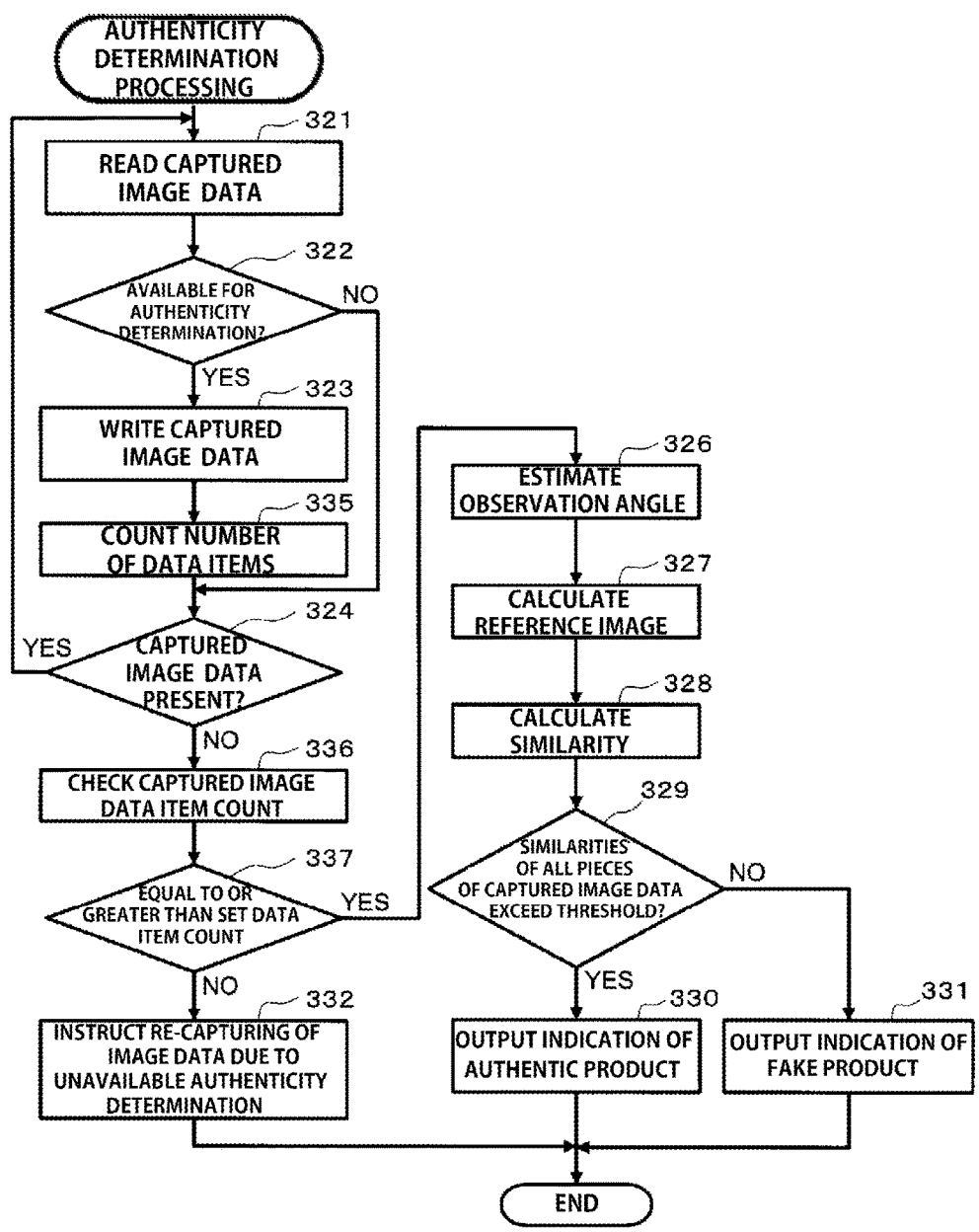
FIG. 14 is a flowchart of an example of a second authenticity determination technique.

FIG. 14 is a flowchart of an example operation of the authenticity determination processing in an identification method by the second authenticity determination technique.

Steps 321 to 323 and steps subsequent to a step 326 are similar to those of the operation of the flowchart of FIG. 13 in the first authenticity determination technique. Only operation different from that of the first authenticity determination technique will be described below.

(Step 335)

The available image selection unit 206 counts the number of pieces of the authenticity determination captured image data in the image data storage unit 211.

(Step 324)

The available image selection unit 206 determines whether captured image data for which the processing of determining whether comparison is available is not performed yet remains in the image data storage unit 211. Processing proceeds to step 321 if unprocessed captured image data for which processing to determine whether comparison is possible remains, and proceeds to a step 336 in a case where there is no such data.

(Step 336)

The available image selection unit 206 determines whether the number of pieces of the authenticity determination captured image data is equal to or greater than a preset data item count threshold.

The processing proceeds to a step 326 in a case where the number of pieces of the authenticity determination captured image data is equal to or greater than the data item count threshold, and proceeds to a step 332 in a case where the number of pieces of the authenticity determination captured image data is less than the data item count threshold.

<Third Authenticity Determination Technique>

Figure 15:
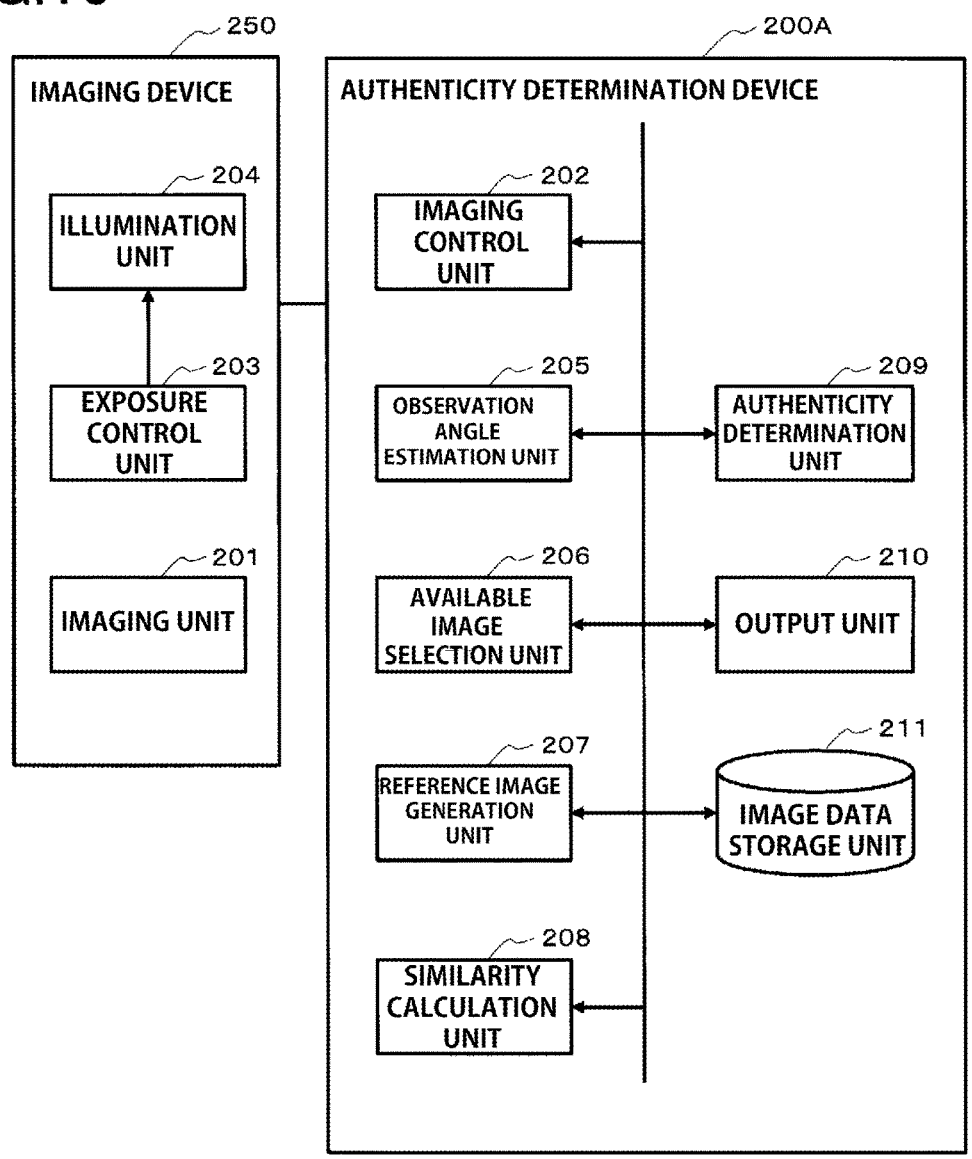
FIG. 15 is a block diagram of an example configuration of an authenticity determination device applied to a third authenticity determination technique.

FIG. 15 is a block diagram of an example configuration of a device according to authenticity determination processing in a third authenticity determination technique of the present invention. In FIG. 15, an authenticity determination device 200A and an imaging device 250 are provided.

In the present authenticity determination technique, it is configured such that imaging and exposure functions in the first authenticity determination technique are, as the imaging device 250, separated from the authenticity determination device 200A. With this configuration, a versatile digital camera or mobile terminal can be easily used as an imaging device for authenticity determination, for example.

Although not shown in the figure, the imaging device 250 exchanges, as a cloud configuration, data with the digital camera or the mobile terminal via the Internet etc., and therefore, an easily operable configuration can be provided.

Other Embodiments

Figure 16:
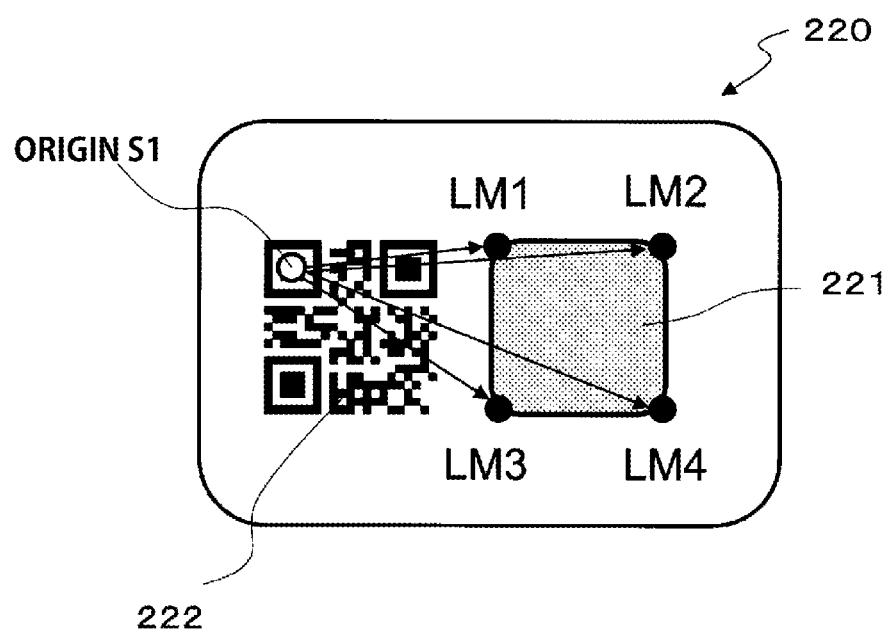
FIG. 16 is a plan view of another example of the identification medium of the present invention.

The above-described embodiment describes such a configuration that the variable light pattern portion 121 and the code information recording portion 122 overlap each other in the identification medium 120 as illustrated in FIGS. 2 to 4. However, as illustrated in FIG. 16, it may be configured such that a variable light pattern portion 221 and a code information recording portion 222 are arranged in parallel in an identification medium 220, for example.

In the above-described configuration of the present embodiment, the variable light pattern portion and the code information recording portion are separately produced, and are arranged and bonded as if a single identification medium is formed. Thus, the identification medium might be erroneously recognized as authentic in authenticity determination.

Figure 17:
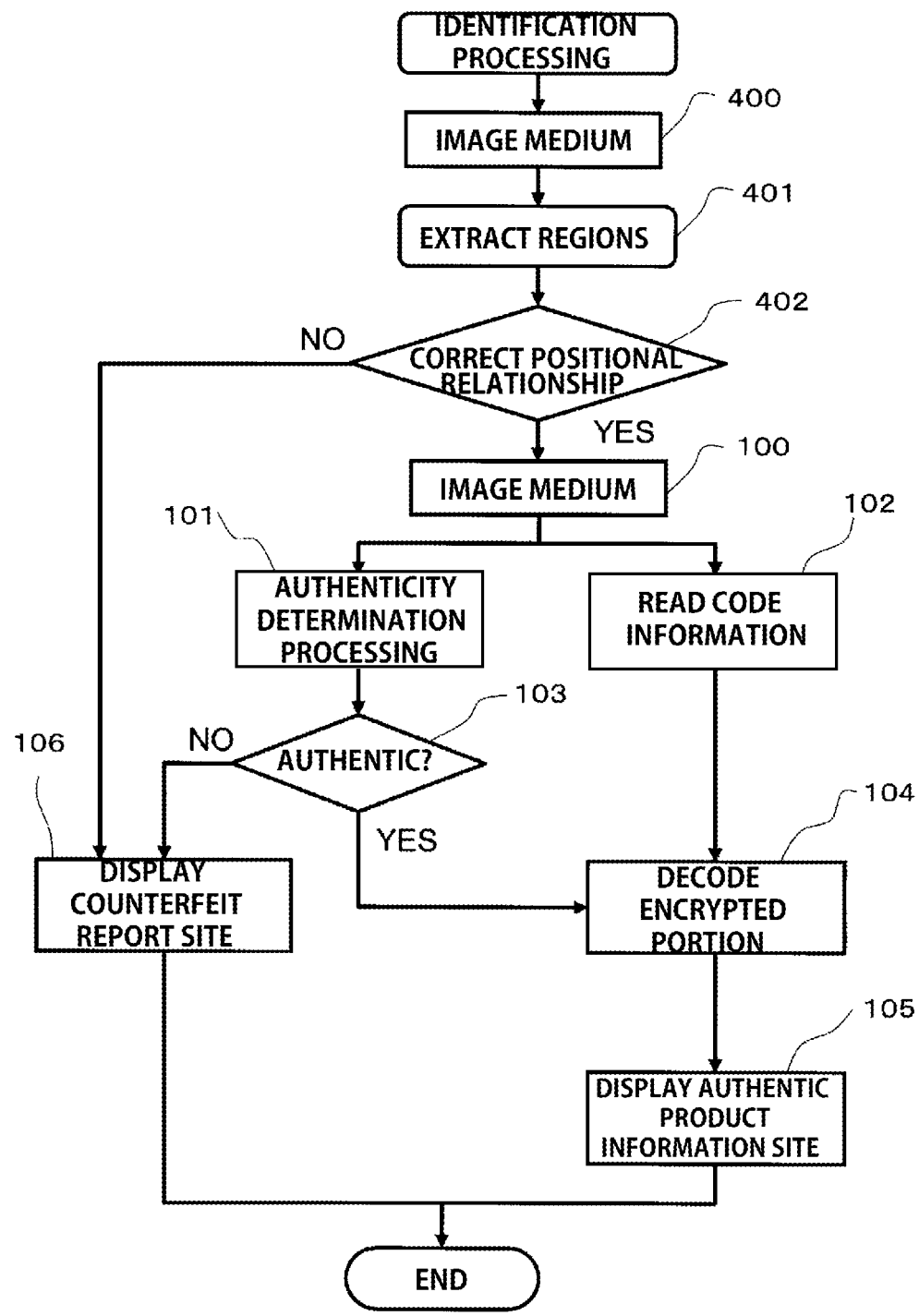
FIG. 17 is a flowchart of another example of the identification method of the present invention.

Considering such a case, the processing of determining an identification medium positional relationship may be, as shown in FIG. 17, further performed at steps 100 to 106 of the identification processing of FIG. 1. For example, imaging 400 of the identification medium 220 is first performed before the authenticity determination processing 101 by imaging 100 of the identification medium 220. Then, extraction 401 of regions of the variable light pattern portion 221 and the code information recording portion 222 is performed, and then, determination 402 on accuracy of a positional relationship between these portions is performed. When the positional relationship is not accurate, the identification medium 220 may be taken as a counterfeit product. Then, countermeasures such as displaying 106 of a counterfeit report site may be performed without proceeding to the authenticity determination processing 101, and the processing ends.

Figure 18:
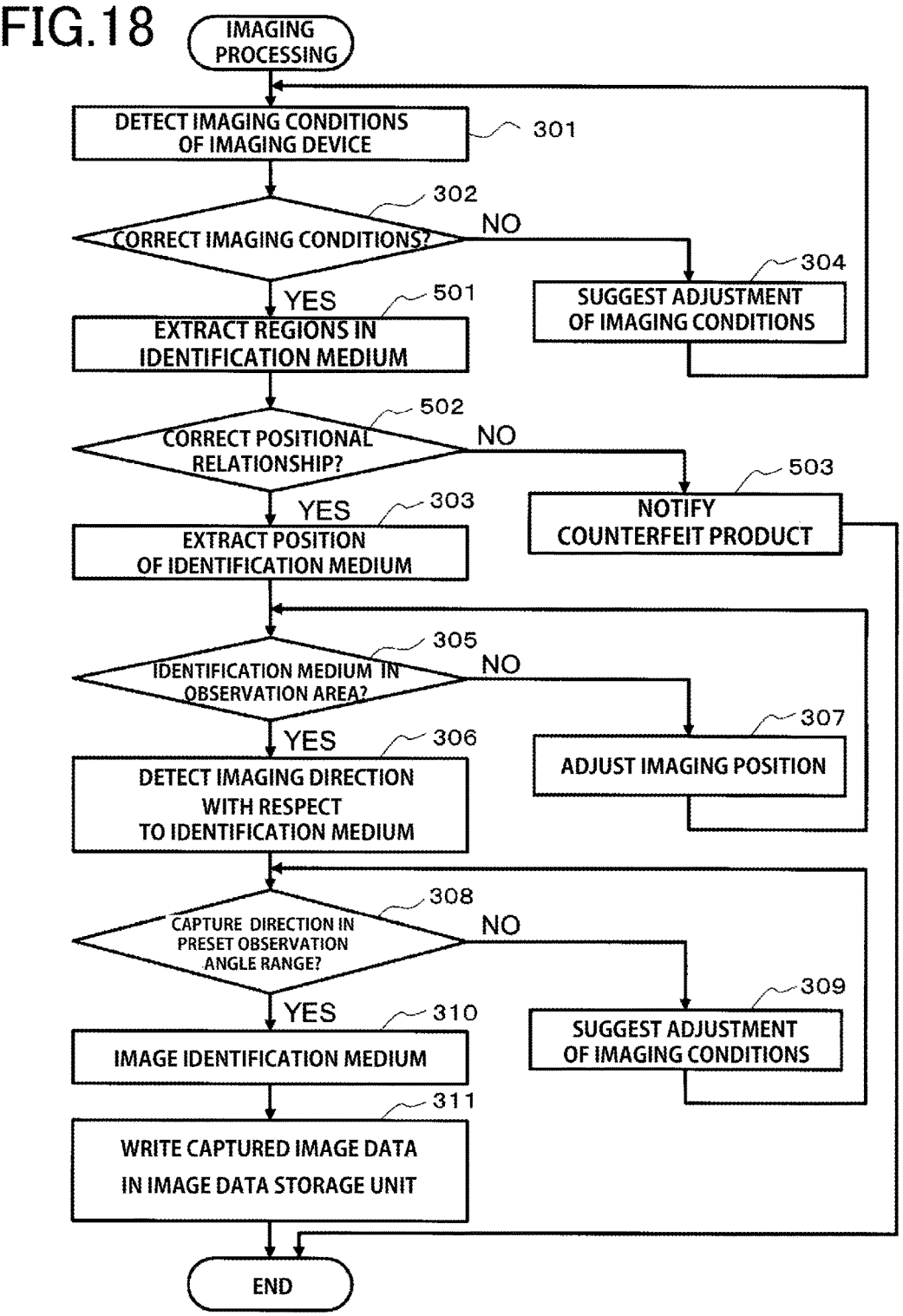
FIG. 18 is a flowchart of an example of imaging processing of the identification medium of FIG. 16.

For extraction 401 of the regions and determination 402 on accuracy of the positional relationship, the same method (template matching) as that in the authenticity determination processing is applicable. That is, a database of reference image data with a correct positional relationship is compiled. Moreover, as shown in FIG. 18, extraction 501 of the position of the identification medium 220 to be imaged is performed in imaging processing.

For calculating the positional relationship between the variable light pattern portion 221 and the code information recording portion 222, each region of the variable light pattern portion 221 and the code information recording portion 222 needs to be extracted from a captured image. The method for such extraction includes edge detection on the premise of a color step of the outline of each region, or the general image processing technique of arranging a geometric pattern such as an AR (Augmented Reality) marker on the outline of each region, thereby extracting image features for identifying the positional relationship between the regions. For example, in the case of edge detection, an outer frame may be provided at each of the variable light pattern portion 221 and the code information recording portion 222, or a background color of a peripheral region may be differentiated from that of a design. In the case of using the geometric pattern, a marker with asymmetric properties may be, as in a QR code etc., used such that the outline and the vertical direction are recognized from patterns placed at three corners.

When the position of the variable light pattern portion 221 is extracted by the above-described processing, comparison with the correct position on the reference image data is performed, and determination 502 on whether the imaged position is correct is performed. When the imaged position is correct, the processing proceeds to imaging position extraction after step 303. When the imaged position is not correct, determination 503 as a counterfeit product is made, and the imaging processing ends.

Note that in the case of such a configuration that the variable light pattern portion 221 and the code information recording portion 222 are arranged in parallel as in the present embodiment, when a correct position of each coordinate point, which defines the region of the variable light pattern portion, from an origin position is known, template matching can be, as illustrated in FIG. 16, performed such that the positions of coordinate points (LM1 to LM4), which define the region of the variable light pattern portion, from an origin position S1 are extracted upon imaging and are compared with correct positions.

As described above, the processing of determining the positional relationship for the identification medium is performed, and therefore, correct authenticity determination can be easily performed even in such a configuration that the variable light pattern portion and the code information recording portion are arranged in parallel.

In any of the configuration in which the variable light pattern portion and the code information recording portion overlap each other and the configuration in which the variable light pattern portion and the code information recording portion are arranged in parallel as illustrated in FIGS. 2 to 4 and 16, the variable light pattern portion and the code information recording portion are preferably within a single image when the identification medium is imaged. Alternatively, even in a case where these portions are not within a single image, the above-described configuration can be used for determination described above as long as the variable light pattern portion and the code information recording portion are both within an image as a result of imaging of a plurality of images and synthesis of the plurality of images in an origin coordinate system. The method for stitching images in association with camera movement, such as a Structure from Motion technique used for three-dimensional shape measurement, may be used as an image synthesis method.

Moreover, the number of captured images when imaging is not limited to one, and a plurality of captured images can be used for determination as described above.

INDUSTRIAL APPLICABILITY

Authenticity determination can be, without use of a special device, performed for an identification medium having an anti-counterfeiting effect which has been typically difficult to be identified by a common user, and a high-security service using code information etc. can be provided. Various services such as member control and an information service for a user having purchased expensive brand goods and a service for guiding a user to a members-only site can be provided.

REFERENCE SIGNS LIST

110 Article; 120, 220 Identification medium; 121, 221 Variable light pattern portion; 122, 222 Code information recording portion; 123 Variable light pattern portion and code information recording portion; 124 Support body; 125 Recessed-raised structure formation layer; 126 Light reflection layer; 127 White color masking layer; 128 Code information printing portion; 129 Angle dependent color changing layer; 130 Light source; 130A Light irradiation direction; 140 Normal line; 150 Cross grating structure; 151 Raised portion; 160 Incident light; 161 Zero-order diffracted light (specular reflected light); 162 First-order diffracted light; 200, 200A Authenticity determination device; 201 Imaging unit; 201A Imaging direction; 202 Imaging control unit; 203 Exposure control unit; 204 Illumination unit; 205 Observation angle estimation unit; 206 Available image selection unit; 207 Reference image generation unit; 208 Similarity calculation unit; 209 Authenticity determination unit; 210 Output unit; 211 Image data storage unit; 250, 250A Imaging device; 260 Illumination device.

What is claimed is:

1. An identification method for performing authenticity determination on an identification medium having code information and having a variable light pattern portion whose pattern of observed light varies with change in an observation angle and for performing reading of the code information, the method comprising:
generating, for captured image data of the variable light pattern portion of the identification medium, reference image data corresponding to the observation angle as an angle of an imaging direction of the captured image data with respect to a reference line of an observation target surface of the identification medium by a reference image generation unit;
obtaining a degree of similarity between the captured image data and the reference image data; and
performing, based on whether the degree of similarity exceeds a preset threshold, the authenticity determination about whether the identification medium is authentic and reading the code information, wherein an observation angle estimation unit is further provided, the observation angle estimation unit being configured to obtain, in a three-dimensional space where the identification medium is placed when the captured image data is captured, capture position and direction of the captured image data by a predetermined coordinate transformation equation, thereby obtaining the observation angle from the capturing position and direction.

2. The identification method of claim 1, wherein an authenticity determination unit compares each of a plurality of different pieces of captured image data and reference image data corresponding to the observation angle for the captured image data, thereby performing authenticity determination based on whether the degree of similarity between the captured image data and the reference image data exceeds the threshold.

3. The identification method of claim 1, wherein an available image selection unit is further provided, the available image selection unit being configured to determine whether the observation angle for the captured image data is within a range available for the authenticity determination on the variable light pattern portion of the identification medium, thereby selecting captured image data available for the authenticity determination from the captured image data to output the selected captured image data as available captured image data.

4. The identification method of claim 1, wherein according to a result of the authenticity determination, operation of application software corresponding to the read code information is controlled.

5. The identification method of claim 1, wherein an imaging process of acquiring the captured image data and a process of reading the code information are performed by an identical imaging unit.

6. The identification method of claim 1, wherein the imaging process of acquiring the captured image data and the process of reading the code information are simultaneously performed by the identical imaging unit.

7. The identification method of claim 1, wherein determination on a positional relationship between the variable light pattern portion and a code information recording portion is performed before the authenticity determination.

8. An identification method for performing authenticity determination on an identification medium having code information and having a variable light pattern portion whose pattern of observed light varies with change in an observation angle and for performing reading of the code information, the method comprising:
generating, for captured image data of the variable light pattern portion of the identification medium, reference image data corresponding to the observation angle as an angle of an imaging direction of the captured image data with respect to a reference line of an observation target surface of the identification medium by a reference image generation unit;
obtaining a degree of similarity between the captured image data and the reference image data; and
performing, based on whether the degree of similarity exceeds a preset threshold, the authenticity determination about whether the identification medium is authentic and reading the code information,
wherein an available image selection unit is further provided, the available image selection unit being configured to determine whether the observation angle for the captured image data is within a range available for the authenticity determination on the variable light pattern portion of the identification medium so that to determine whether the captured image data can be compared with the reference image data, thereby selecting captured image data available for the authenticity determination from the captured image data to output the selected captured image data as available captured image data.

* * * * *